United States Patent
Nies

(10) Patent No.: US 12,497,951 B2
(45) Date of Patent: Dec. 16, 2025

(54) CABINS AND METHODS FOR WIND TURBINE MAINTENANCE

(71) Applicant: General Electric Renovables Espana, S.L., Barcelona (ES)

(72) Inventor: Jaco Nies, Hertme (NL)

(73) Assignee: GE Vernova Renovables Espana, S.L., Barcelona (ES)

( * ) Notice: Subject to any disclaimer, the term of this patent is extended or adjusted under 35 U.S.C. 154(b) by 6 days.

(21) Appl. No.: 18/351,845

(22) Filed: Jul. 13, 2023

(65) Prior Publication Data
US 2024/0018944 A1   Jan. 18, 2024

(30) Foreign Application Priority Data
Jul. 15, 2022 (EP) .................................... 22382675

(51) Int. Cl.
*F03D 80/50* (2016.01)
*F03D 13/20* (2016.01)

(52) U.S. Cl.
CPC ......... *F03D 80/501* (2023.08); *F03D 13/201* (2023.08); *F05D 2230/72* (2013.01)

(58) Field of Classification Search
CPC ...... F03D 80/501; F03D 13/201; F03D 80/50; F05D 2230/72; F05B 2230/80; F05B 2260/507
See application file for complete search history.

(56) References Cited

U.S. PATENT DOCUMENTS

| | | | |
|---|---|---|---|
| 8,083,029 B2* | 12/2011 | Teichert | F03D 80/50 182/136 |
| 9,869,294 B2 | 1/2018 | Lazaro et al. | |
| 10,260,483 B2 | 4/2019 | Teichert | |
| 10,364,793 B2 | 7/2019 | Ebbesen et al. | |
| 10,801,220 B2* | 10/2020 | Oowaku | E04G 3/30 |
| 2007/0007074 A1* | 1/2007 | Lemburg | F03D 80/50 182/128 |
| 2011/0303488 A1* | 12/2011 | Besselink | E04G 3/30 182/142 |
| 2012/0241255 A1* | 9/2012 | Gomez Santamaria | E06C 7/16 182/113 |
| 2014/0054110 A1* | 2/2014 | Fernandez Gomez | E04G 3/30 182/19 |
| 2017/0067438 A1* | 3/2017 | Ebbesen | F03D 1/0691 |

(Continued)

FOREIGN PATENT DOCUMENTS

| | | |
|---|---|---|
| CN | 1902398 A | 1/2007 |
| CN | 114017272 A | 2/2022 |

(Continued)

OTHER PUBLICATIONS

European Search Report Corresponding to EP22382675 on Dec. 14, 2022.

*Primary Examiner* — Matthew T Largi
(74) *Attorney, Agent, or Firm* — Dority & Manning, P.A.

(57) ABSTRACT

The present disclosure relates to cabins (100) and methods (200, 300) for performing maintenance on wind turbines (10). A cabin (100) for performing maintenance on an uptower component (110) of a wind turbine (10) is provided. The cabin (100) is configured to support an operator and/or a tool inside the cabin (100). The cabin (100) is attachable to the wind turbine (10) such that it is rotatable with respect to the uptower component (110).

16 Claims, 5 Drawing Sheets

(56) References Cited

U.S. PATENT DOCUMENTS

2022/0282710 A1   9/2022  Osorio Martinez et al.
2023/0059355 A1   2/2023  Baun

FOREIGN PATENT DOCUMENTS

| EP | 3139033 | A1 | | 3/2017 |
|----|---------|-----|---|--------|
| EP | 3379079 | A1 | | 9/2018 |
| EP | 3444471 | B1 | | 4/2020 |
| KR | 20120114981 | A | * | 4/2011 |
| WO | WO2021136570 | A1 | | 7/2021 |

* cited by examiner

CABINS AND METHODS FOR WIND TURBINE MAINTENANCE

The present disclosure relates to cabins and methods for performing maintenance on wind turbines. The present disclosure further relates to wind turbines including such cabins.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

Maintenance, e.g. repair, of a wind turbine is usually required after a certain time period since the installation or the start of operation of the wind turbine, or if a wind turbine component has been damaged or broken. Additionally, visual inspection may be necessary or planned periodically to ensure that no damage or deterioration goes unnoticed. Repairing wind turbines may be difficult for the operators and present a health and safety hazard, as they may need to access wind turbine portions which may be at heights above 50, 70, 100 or more meters. Wind gusts and varying weather conditions may also increase the risks when doing maintenance.

Sometimes, an operator may be secured to the wind turbine through one or more ropes and may access an exterior of a wind turbine component or portion to be repaired by hanging from one of the ropes. This may be dangerous and uncomfortable for the operator, especially if reaching under the component or portion, e.g. for reaching a bottom side of a nacelle or a hub, or reaching an outside of a generator of a direct drive wind turbine.

Another option is to hang a platform from the wind turbine such that an operator can move on the platform and repair from the platform. A platform may for example be suspended from the nacelle or the rotor for accessing a blade. Connections between the platform and the blade, e.g. rigid arms, may facilitate keeping the platform relatively static and close to the blade. Some platforms may completely surround a blade. Hanging platforms may be complicated to install for accessing an outside of certain wind turbine components such as a generator of a direct drive wind turbine or the lateral and upper sides of a nacelle or a hub.

SUMMARY

In an aspect of the present disclosure, a cabin for performing maintenance on an exterior of an uptower component of a wind turbine is provided. The cabin is configured to support an operator and/or a tool inside the cabin. The cabin is attachable to the wind turbine such that the cabin is rotatable with respect to the uptower component.

According to this aspect, a cabin in which one or more operators can enter and/or one or more tools can be introduced and perform maintenance operations on an exterior of a wind turbine is provided. The cabin is attachable to the wind turbine such that the cabin may rotate with respect to the uptower component.

Such a cabin, when installed on a wind turbine, may allow performing maintenance or inspection on several regions of a component which require so.

In a further aspect of the disclosure, a method for performing maintenance of an uptower component of a wind turbine is provided. The method comprises attaching a cabin configured to support an operator and/or a tool inside the cabin to the wind turbine. The method further comprises rotating the cabin with respect to the uptower component to a maintenance position. The method further comprises performing maintenance of the uptower component in the maintenance position.

Still in a further aspect of the disclosure, another method is provided. The method comprises attaching a cabin to an outside of a wind turbine generator of a direct drive wind turbine. The method further comprises displacing the cabin along a circumference of the wind turbine generator to a maintenance position. The method further comprises performing maintenance in the maintenance position.

Definitions

Throughout this disclosure, a cabin may be understood as a substantially closed structure which is configured, e.g. sized and shaped, to fully enclose an operator and/or a tool. I.e., an operator and/or a tool inside the cabin may be substantially completely surrounded by the cabin walls. A cabin e.g. may have a bottom wall, a top wall and one or more lateral walls extending between the top and bottom walls. A cabin may comprise one or more hatches which may be opened and closed as necessary, e.g. for allowing the entrance and exit of people and tools, as well as for deploying tools or structures for helping with the maintenance operations.

Throughout this disclosure, an uptower component may be understood as a wind turbine component which is directly or indirectly supported by the tower, and in particular may be located above the wind turbine tower when the wind turbine is assembled. An uptower component may e.g. be a nacelle or a stator (a stator of a direct drive wind turbine) or a generator rotor (of a direct drive wind turbine) or a wind turbine rotor or a hub or a yaw system.

Throughout this disclosure, maintenance or maintenance operations may also be understood to cover inspection, repair and repair operations as well as activities of a similar nature performed on a wind turbine. For example, maintenance may include inspections of joints or other connections, tightening of bolts and repair of a composite structure. Maintenance may e.g. include replacing through-bolts connecting stator poles to a stator frame of a direct drive wind turbine generator, the stator surrounding a rotor of the generator.

DETAILED DESCRIPTION OF EXAMPLES

Figure 1:
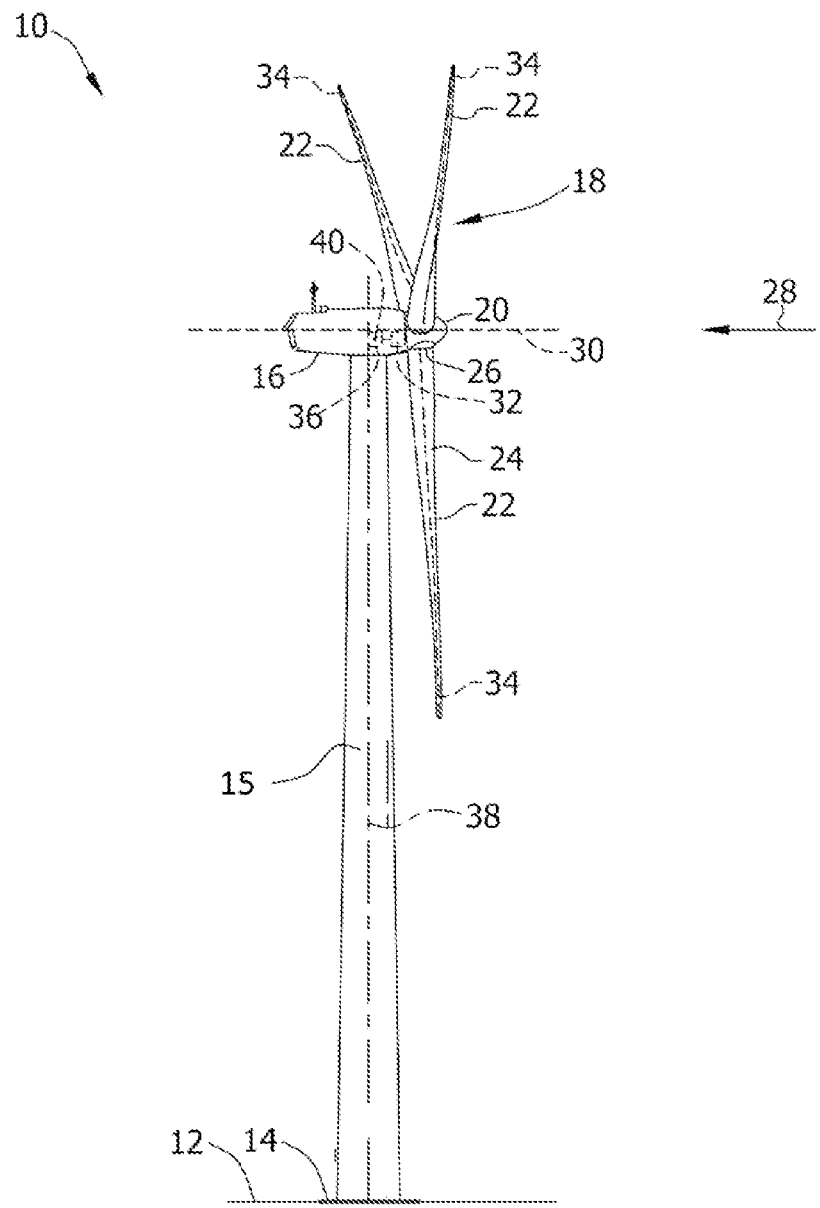
FIG. 1 illustrates a perspective view of one example of a wind turbine.

Reference now will be made in detail to embodiments, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 may include a processor 40 configured to perform some of the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

A control system 36 may also include a memory, e.g. one or more memory devices. A memory may comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s) 40, configure the controller 36 to perform, or trigger the performance of, various steps disclosed herein. A memory may also be configured to store data, e.g. from measurements and/or calculations.

Figure 2:
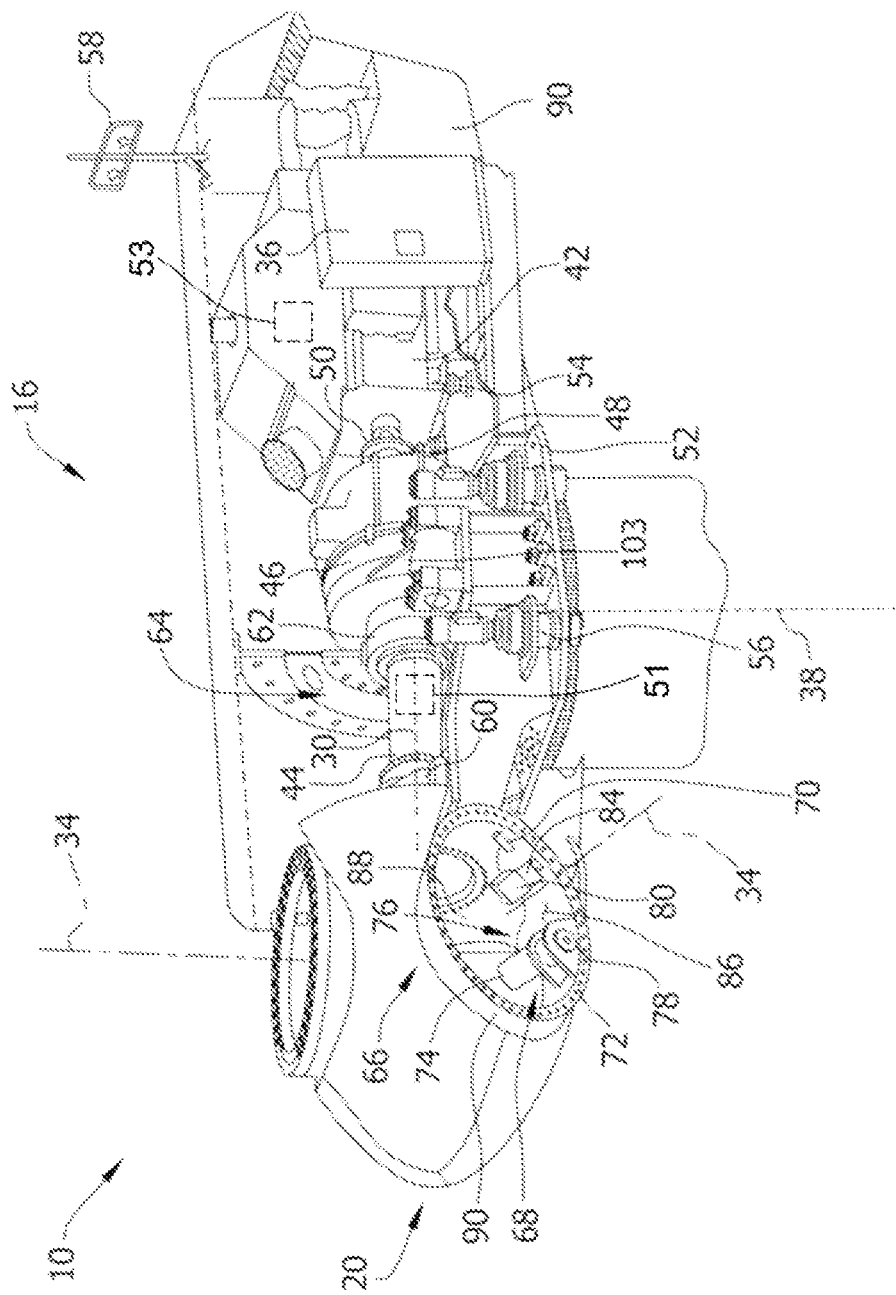
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

In an aspect of the disclosure, a cabin 100 for performing maintenance on an exterior of an uptower component 110 of a wind turbine 10 is provided. The cabin 100 is configured to support an operator and/or a tool inside the cabin. The cabin 100 is attachable to the wind turbine 10 such that the cabin is rotatable with respect to the uptower component 110.

According to this aspect, a cabin 100 which may be moved around an uptower component 110, or which may be moved with a hub 20 (or nacelle 16) when the wind turbine rotor 18 (the nacelle 16) is rotated (yawed), is provided. One or more operators and/or one or more tools may be inside the cabin 100 and perform the necessary maintenance operations from the cabin 100. In some examples, a tool may be a robotic tool, e.g. a tool which can be controlled actuated from outside the cabin, e.g. from the ground.

For example, the cabin may be configured to be connected to an external side of an uptower component such as a nacelle or a direct drive wind turbine generator and may be movable around such uptower component. The cabin may be stopped and kept in a certain position around the uptower component for performing maintenance. Or for example the cabin may be configured to be connected to an external side of the hub and may move with the hub when the hub (in general the wind turbine rotor) is rotated. The cabin may be kept in a same position with respect to the hub of a direct drive wind turbine, but the position of the cabin may be varied e.g. with respect to the generator of the direct drive wind turbine. Still in other examples, the cabin may be configured to be connected to an external bottom side of the nacelle such that the cabin may be kept in a same position with respect to the nacelle. When the nacelle is yawed, the cabin may e.g. move with respect to a yaw system but not with respect with the nacelle.

A cabin which may be moved along a sequence of positions may allow the operators to access regions of the wind turbine which may be difficult to reach in a more comfortable and safe manner for them.

As the cabin 100 may e.g. be moved with respect to the uptower component 110, for example around the uptower wind turbine component 110 to which the cabin 100 is attached, or with the hub 20 or the nacelle, several different regions of the uptower wind turbine component 110 may be safely and easily accessed. For example, different tangential positions on an external side of a direct drive wind turbine generator, i.e. along a tangential direction of the generator, may be accessed and maintained as required.

The uptower component may be a static uptower component in some examples. A static uptower component may be understood as an uptower wind turbine component in the sense that it is not expected that the component moves significantly during a certain period of time, if at all. For example, the component may be configured to move only in response to certain actions and/or conditions, or the component may have been stopped and optionally locked for maintenance to be performed. Such a period of time may e.g. be ended by undesired vibrations or an action such as yawing. A static uptower component may therefore be e.g. a nacelle or a stator (of e.g. a direct drive wind turbine). A static uptower component may also be a generator rotor (of e.g. a direct drive wind turbine) or a wind turbine rotor or a hub, if fixed in place or locked for a period of time when maintenance is performed. A static uptower component may also be a yaw system.

An uptower component 110 may e.g. be a wind turbine generator component, e.g. an external rotor or an external stator of a generator of a direct drive wind turbine in some examples. Herein, an external rotor refers to a rotor surrounding a stator with a radial air gap between the stator and the rotor, and an external stator refers to a stator surrounding a rotor with such a radial air gap.

An uptower component 110 may be a nacelle 16 or a yaw system in some other examples. A cabin 100 described throughout this disclosure may e.g. be particularly helpful for reaching a bottom side of a nacelle (and/or a top of a tower or a bottom side of a generator of a direct drive wind turbine in a safe and comfortable manner for an operator.

Figure 3:
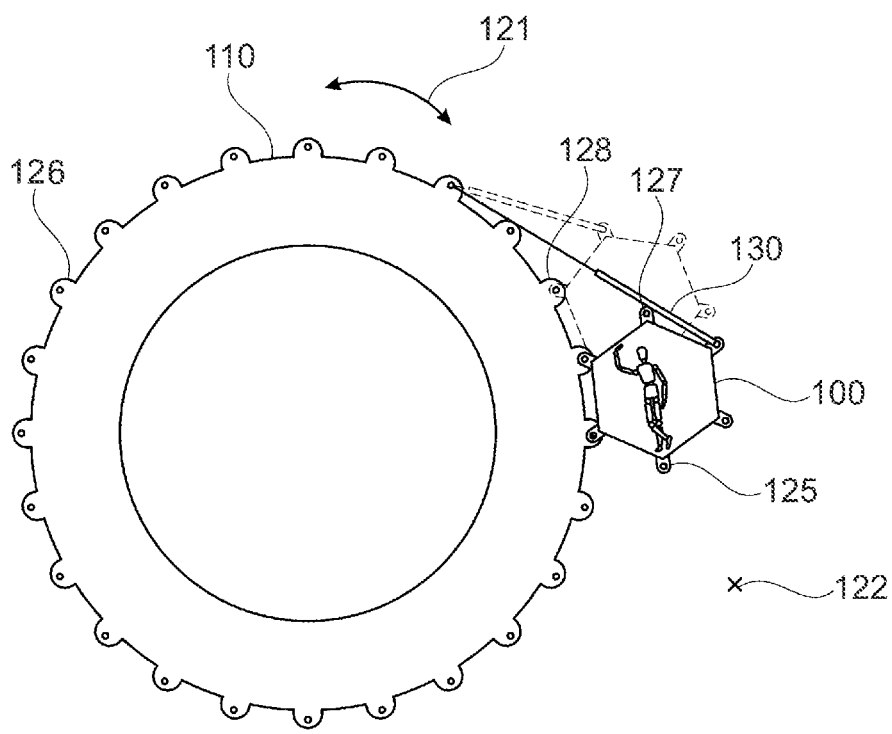
FIG. 3 schematically illustrates a front view of an example of a cabin connected to an external stator of a generator of a direct drive wind turbine.
Figure 4A:
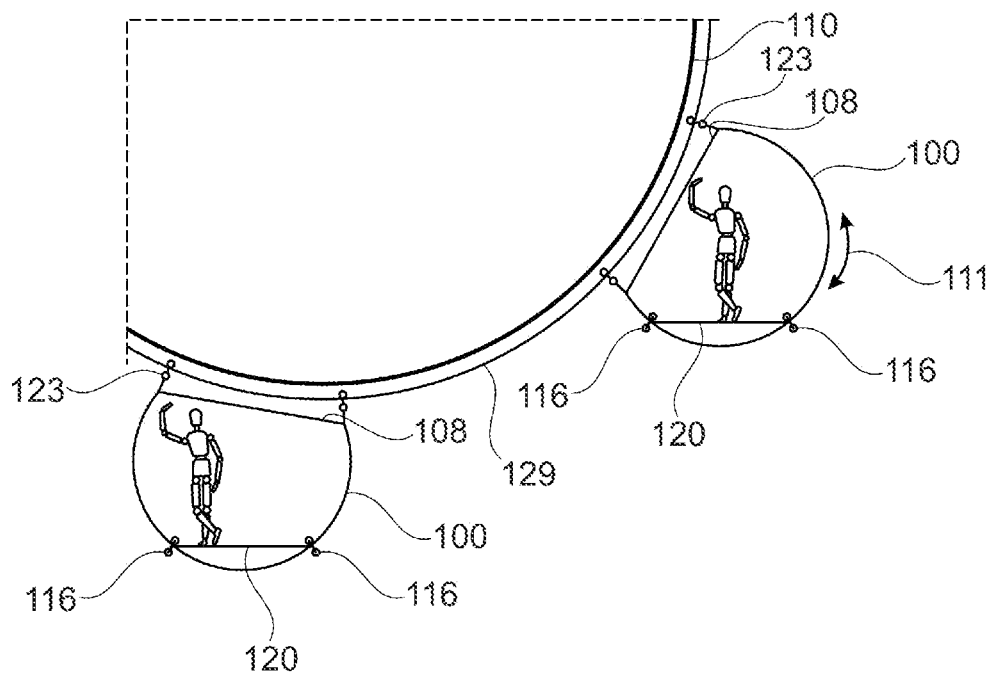
FIGS. 4A and 4B schematically show a front view and a lateral view of another example of a cabin connected to an external stator of a generator of a direct drive wind turbine, respectively.
Figure 4B:
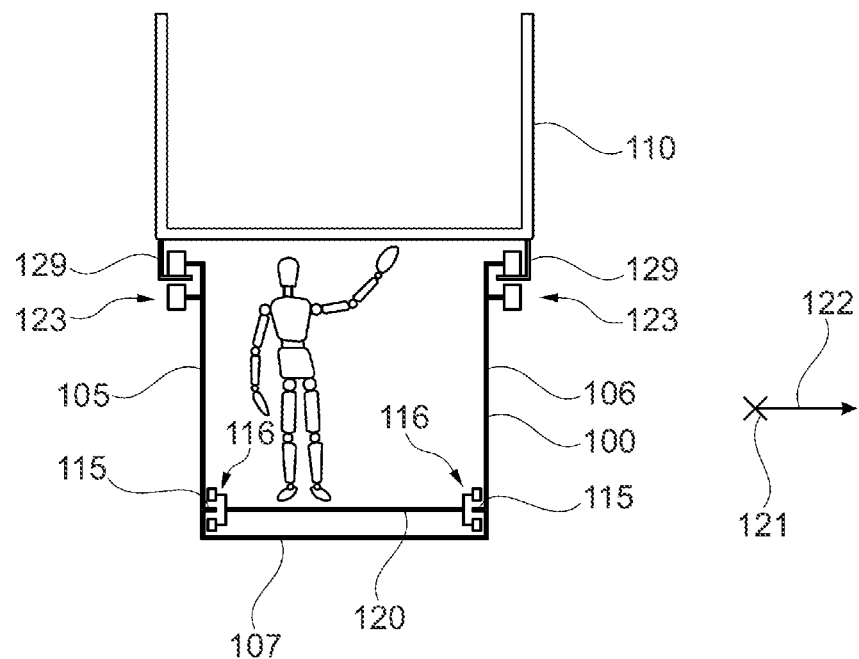

A schematic example of a cabin 100 mounted to an external stator of a direct drive wind turbine is shown in FIG. 3. Another schematic example of a cabin 100 mounted to an external stator of a direct drive wind turbine is shown in FIGS. 4A and 4B. The cabins in these figures are configured, e.g. sized and shaped, to support at least one or more operators inside the cabin. FIGS. 3 and 4B show the cabin 100 in two different tangential positions around the stator 110. In the examples of these figures, the cabin 100 is attachable to the uptower component 110 (the generator stator in these figures) such that the cabin 100 is rotatable about a central axis of the uptower component 110. The central axis may refer to an axis of the uptower component extending along an axial direction 122 or along a longitudinal direction. In some examples, e.g. if the uptower component is a generator or a generator rotor or a generator stator of a direct drive wind turbine, the central axis may extend along an axial direction of the generator (component). In some other examples, e.g. if the uptower component is a nacelle, the central axis may extend along a longitudinal direction of the nacelle.

In the example of FIG. 3, the cabin 100 is also attachable to the uptower component 100 such that the cabin 100 is rotatable about a central axis of the cabin 100. The central axis of the cabin may refer to an axis of the cabin 100 which is parallel to the central axis of the uptower component 110.

As may be seen in the example of FIGS. 4A and 4B, the cabin 100 may further comprise a floor 120 floor which is displaceable with respect to the cabin 100 such that the floor 120 provides a substantially horizontal support in different positions of the cabin 100. For example, the floor 120 may be configured to rotate along a tangential direction 111 of the cabin 100 for providing a horizontal support for an operator inside the cabin 100 when the cabin 100 is rotated. In this manner, when the cabin 100 rotates around the stator or any suitable uptower component, or rotates with the hub, the floor 120 may have a horizontal orientation at all times. An operator may therefore be more stable and comfortable inside the cabin 100 than if such a floor 120 is not provided. In some examples, the floor 120 may be a platform, e.g. a rectangular-shaped or squared-shaped platform.

The floor 120 may be movably coupled to an inside of the cabin. In some examples, the floor 120 may be displaceable along an inner wall of the cabin 100 or along a structure within the cabin. The floor 120 may have one or more suitable guiding elements 116 for moving along or inside the cabin 100. For example, the cabin 100 may comprise one or more tracks 115 along which the floor 120 may move.

In some examples, as e.g. in the example of FIG. 4B, the cabin 100 may comprise two opposite tracks 115 on the front 105 and back 106 sides of the cabin 100 which extend along a tangential direction 111 of the cabin 100. The front 105 and back 106 sides of the cabin may be parallel to a rotor 18 plane in some examples. The front side 105 may be an upwind side and the back side 106 may be a downwind side. In other examples, one or more tangentially extending tracks may be provided on an outside tangential side 107 of the cabin 100. Gliding pads may be provided between the floor 120 and the one or more tracks 115 for allowing the floor 120 to rotate in a tangential direction 111 of the cabin with respect to the cabin 100.

Instead of having one or more gliding bearings for enabling the rotation of the floor 120, other suitable rotation arrangements may be provided. For example, two or more roller bearings may be provided for rotatably coupling the floor 120 to the cabin 100. A plurality of wheels may also be provided to this end, e.g. similarly to a set of wheels used to movably connect a car or train to a roller coaster.

In some examples, the floor may be locked or otherwise fixed in place in several different predefined orientations with respect to the cabin, e.g. in a limited number of predefined orientations.

Although not shown in the example of FIG. 3, the cabin 100 of FIG. 3 may also include a floor 120 as described above which is movably coupled to the cabin for supporting an operator inside the cabin when the cabin is moved around the stator 110. Circular tracks or rails may be provided for allowing the floor 120 to rotate inside the cabin 100 of FIG. 3.

The cabin 100 may further include one or more securing elements for fixing the floor at a certain position with respect to the cabin 100. If the cabin has been moved up to a position in which maintenance operations are to be performed, the securing elements may keep the floor 120 in the desired orientation, regardless the operator(s) walking or moving tools inside the cabin.

In some examples, the cabin 100 may further comprise a plurality of attachment points 125 configured to be joined to corresponding attachment points 126 of the uptower component 110. The attachment points 125 of the cabin may be regularly spaced along a tangential direction 111 of the cabin 100. Similarly, the attachment points 126 of the uptower component, e.g. an external stator of a direct drive wind turbine, may be regularly spaced along a tangential direction 121 of the uptower component 110. A distance between consecutive attachment points 125 of the cabin and a distance between consecutive attachment points 126 of the uptower component 110 may be the same, as schematically illustrated in FIG. 3. Therefore, when the cabin 100 of the example of FIG. 2 is pulled around the stator, a free attachment point 127 of the cabin may be attached to a free attachment point 128 of the stator, as illustrated by the dotted lines.

The number of attachment points 125 of the cabin 100 may be selected as appropriate. In the example of FIG. 3, the cabin 100 comprises six attachment points 125 on an outside tangential side 107 of the cabin. But the cabin may comprise more or less attachment points 125. In some examples, the attachment points 125 may be provided in a central region of the outside tangential side 107 of the cabin 100. In other examples, the outside tangential side 107 of the cabin 100 may comprise more than one row of attachment points 125. For example, the outside tangential side 107 of the cabin 100 may comprise a first row of attachment points 125 close or at a front edge of the outside tangential side 107 of the cabin, and a second row of attachment points 125 close to or at a back edge of the outside tangential side 107 of the cabin.

The attachment points 125, 126 may in some examples be D-shaped rings or other suitable anchor points. A bolt and a nut may be used to attach an attachment point 125 of the cabin and an attachment point 126 of the uptower component 110. This may secure the cabin 100 to the uptower component 110. A cabin 100 may therefore be movably attached to an uptower component, and the cabin may be secured at certain positions around the uptower component, e.g. locked with pins or nuts and bolts. In these positions, the cabin does not move around the uptower component, and the operators can safely perform maintenance operations.

In some examples, the cabin 100 may further comprise one or more guided elements 123 configured to move along one or more guiding elements 129 of the uptower component 110. The guiding elements 129 may be e.g. rails, such as in the example of FIG. 4.

Guided elements 123 may allow a more gradual placement of the cabin 100 on a desired tangential position than the use of a plurality of fixed attachment points 125. Similarly to the guiding elements 116 of the floor 120, the one or more guided elements 123 of the cabin 100 may include a roller bearing ring, a gliding bearing track, one or more gears, e.g. pinions, a plurality of wheels or other suitable elements which allow the cabin 100 to contact a rail or other guiding element on the uptower component 110 and to move on the rail around the uptower component 110 along a tangential direction 121 of the uptower component 110.

One or more guided elements 123 of the cabin 100 may be provided on the front 105 and back 106 sides of the cabin 100, as e.g. in the example of FIG. 4B. In other examples, a proximal tangential side 108 of the cabin 100, i.e. a tangential side of the cabin to be closest to the uptower component, may comprise one or more guided elements 123.

In some examples, such as in the examples of FIGS. 3 and 4, the cabin may be configured to rotate around its own central axis.

In a further aspect of the invention, a wind turbine 10 comprising a cabin 100 according to any of the examples described throughout the present disclosure attached to the wind turbine 10, e.g. movably attached to the uptower component 110 or fixedly attached to the hub 20 or even fixedly attached to the nacelle 16, is provided. The wind turbine 10 comprises a tower 15, an uptower component 110 supported by the tower 15 and a cabin as described herein. The cabin 100 is attached to the wind turbine such that the cabin is rotatable with respect to the uptower component 110.

A fixedly attached cabin may be understood as a cabin which is connected to the hub (or e.g. the nacelle) in a way that one or more points of connection of the cabin to the hub (nacelle) are maintained, without varying their location, as long as the cabin is connected to the hub (nacelle). The cabin may therefore be prevented from moving with respect to the hub (nacelle) when the hub (nacelle) is rotated (yawed). The wind turbine rotor (nacelle) may be stopped and secured at certain positions so that one or more operators may safely perform maintenance operations at those positions. The uptower component 100 may e.g. be an external rotor of a direct drive wind turbine, an external stator of a direct drive wind turbine or a nacelle 16 (or a yaw system).

Even though the cabin may be fixedly attached to the rotor hub, or in some examples to the nacelle, the attachment may be temporary in some of these examples. E.g. the cabin may be lifted using a crane and attached to the hub or the nacelle when maintenance is to be performed. When the maintenance tasks have been carried out, the cabin may be removed. It should be clear that a cabin may also be movably attached to the nacelle. Irrespective of the movable or fixed attachment of the cabin to the nacelle, maintenance on e.g. the nacelle and/or the top of the tower may be performed. Maintenance on a yaw system may be performed from a cabin attached to the nacelle.

The wind turbine 10 may further comprise an actuator 130 connecting the uptower component 110 and the cabin 100 for rotating the cabin 100 around the uptower component 110. The actuator 130 may e.g. be a linear actuator, a cable or a gear. The term "cable" is intended to cover ropes, chains and similar elements. In this manner, a cabin 100 may be rotated about its central axis when the actuator actuates on the cabin 100, see e.g. the example of FIG. 3.

If the cabin 100 comprises a plurality of cabin attachment points 125 and the uptower component 110 comprises a plurality of cabin attachment points 126, one or more of the attachment points 125 of the cabin 100 may be attached to one or more of the attachment points 126 of the uptower component 110, as e.g. as in the example of FIG. 3. Bolts and nuts may e.g. be used. This may secure the cabin 100 to the uptower component 110.

In these examples, the actuator 130 may connect an attachment point 126 of the uptower component 110 and the cabin 100 for moving the cabin 100 around the uptower component 110. An actuator 130 may be a linear actuator, e.g. a hydraulic actuator or a cable in some examples. FIG. 3 schematically illustrates a hydraulic actuator. It a cable is used, an end of the cable may e.g. be attached to an attachment point 126 of the uptower component 110 and the opposite end of the cable may e.g. be attached to a winch provided on the cabin 100. The winch may comprise a motor for reeling in the cable. The uptower component may comprise suitable edges or protrusions for avoiding the cable moving out of an outer tangential side of the uptower component or for restraining the movement along an axial direction 122 of the cable in some examples. An axial direction may be understood as a direction which is perpendicular to a plane in which the tangential direction lies. For a nacelle, an axial direction may refer to a fore-aft direction. For a wind turbine tower, an axial direction may refer to a vertical direction.

In other examples, e.g. as in the examples of FIGS. 4A and 4B, the uptower component 110 may comprise one or more rails 129 surrounding the uptower component 110 along a tangential direction 121, and the cabin 100 may be attached to the one or more rails 129. In these examples, the actuator 130 may connect a suitable attachment point 126 of the uptower component 110 and the cabin 100. Such an actuator 130 may be a linear actuator or a cable, as in the example of FIG. 3. The actuator 130 may alternatively connect the cabin 100 to a rail 129. The actuator may e.g. be one or more gears such as pinions configured to engage another gear. The rail 129 may comprise a plurality of teeth on which the cabin 100 may mesh and move in some examples. A motor may be provided for moving the one or more gears of the cabin and causing the cabin to advance along the teethed rail. Still in other examples, the cabin may have wheels or one or more ball bearing rings or one or more gliding bearing rings, and a motor may cause the wheels or the ball bearing rings of the gliding bearing rings to move with respect to the one or more rails 129.

Figure 5:
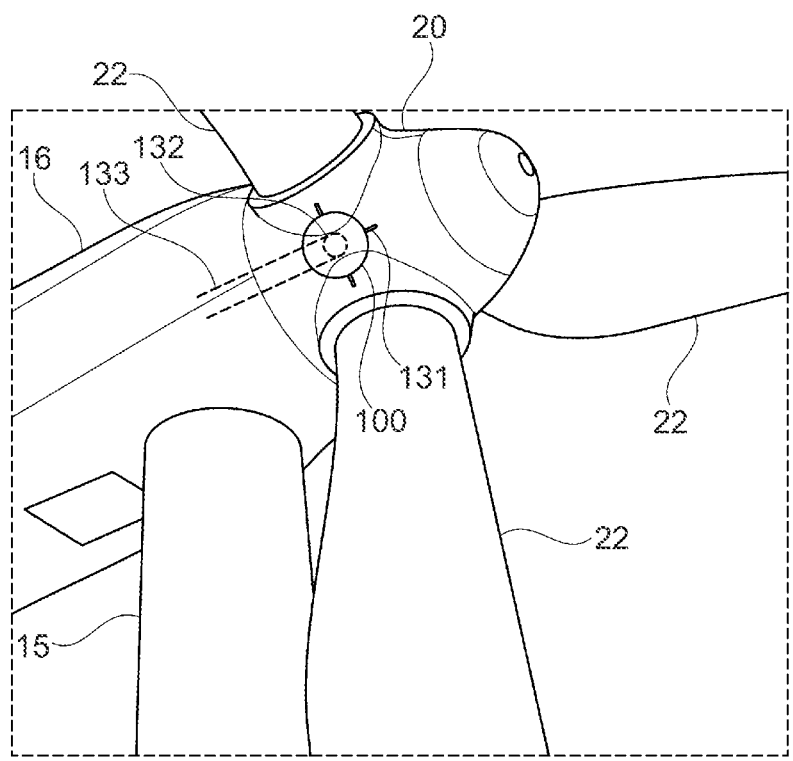
FIG. 5 schematically illustrates a perspective view of an example of a cabin secured to a wind turbine hub.

In the examples where the cabin 100 is fixedly connected to the hub 20 (or the nacelle 16), the cabin 100 may be attached to the wind turbine hub 20 (nacelle 16) by one or more arms 131. FIG. 5 shows a schematic example of a cabin 100 attached to the hub 20 through four arms (one arm is not shown). One or more arms may be telescopic in some examples. A position of the cabin 100 with respect to the hub 20 (nacelle) may be varied for facilitating the access to a region in which maintenance is to be performed. But the point of connection of the arms (or any suitable connector securing the cabin to the hub (nacelle)) does not change while the cabin is connected to the hub (nacelle).

In the examples wherein a cabin 100 is fixedly attached to a hub 20 (or nacelle), the hub 20 (nacelle) may further comprise a hatch 132 for accessing the cabin 100 from an inside of the hub 20 (nacelle). The wind turbine may further comprise a passage 133 connecting the hub hatch 132 and a nacelle 16 of the wind turbine 10. One or more operators may therefore safely access the cabin 100 from the nacelle 16. In these or other examples, a passage may also be provided between the tip of the hub and the hatch 132 of the hub such that an operator may enter the hub from the front of the rotor 18. The cabin 100 may have one or more hatches of suitable shapes and dimensions which may be opened and closed, e.g. for allowing one or more operators to enter and exit the cabin and/or deploying tools or structures to help with maintenance operations. The hub hatch 132 may likewise have any suitable shape and dimension.

Figure 6:
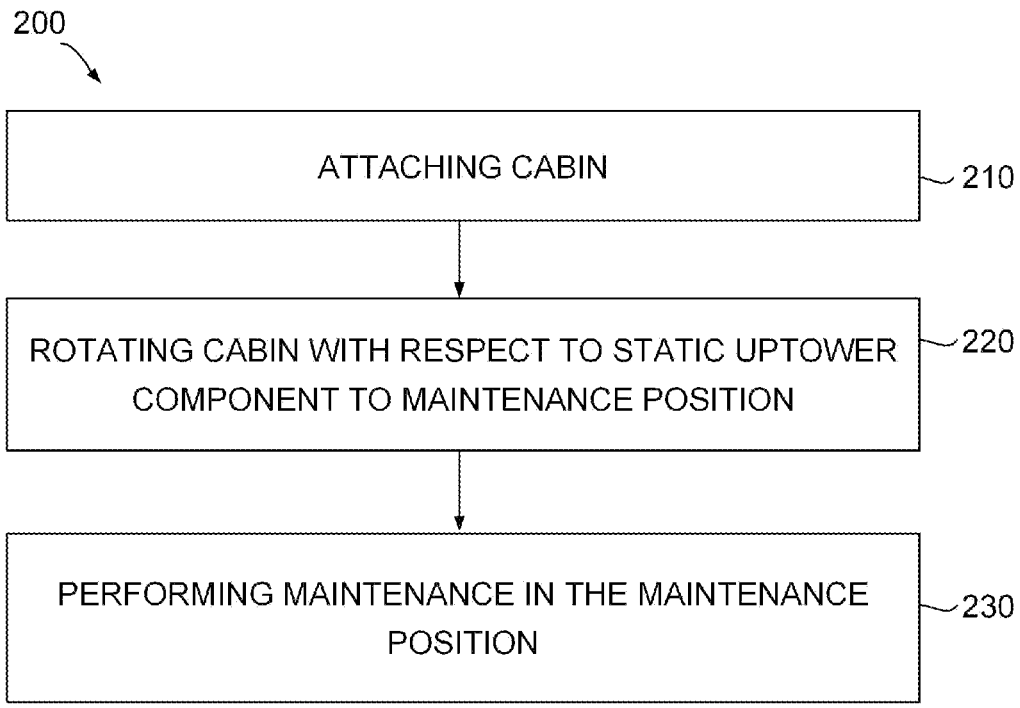
FIG. 6 shows a flow chart of a method for performing maintenance on an exterior side of an uptower component of a wind turbine.

In a further aspect of the disclosure, a method 200 for performing maintenance on an uptower component of a wind turbine 10 is provided. The method is schematically illustrated in the flowchart of FIG. 6. The method comprises, at block 210, attaching a cabin 100 configured to support an operator and/or a tool inside the cabin 100 to the wind turbine 10. The method further comprises, at block 220, rotating the cabin 100 with respect to the uptower component 110 to a maintenance position, e.g. moving the cabin 100 around the uptower component 110 or with the hub 20 or with the nacelle 16 to a maintenance position. The method further comprises, at block 230, performing maintenance of the uptower component 110 in the maintenance position.

Accessing several locations requiring maintenance may be performed in a relatively quick manner while risks and discomfort for the operator(s) may be reduced. As mentioned before, an uptower component 110 may e.g. be an external rotor of a direct drive wind turbine, an external stator of a direct drive wind turbine, or a nacelle 16. An uptower component 110 may also be a yaw system. Explanations and features regarding a cabin 100 and a wind turbine 10 to which the cabin 100 is mounted may apply to this method 200, and vice versa.

An operator may enter the cabin 100, the cabin being e.g. secured to a hub or to an uptower component 110 different from the hub 20. The cabin 100 may be in a starting position.

Rotating the cabin 100 may comprise rotating the hub 20 in the examples where the cabin 100 is secured to the hub 20. An operator may for example access the cabin 100 through a passage 133 connecting an inside of the nacelle 16 and a hub hatch 132. The hub 20 may then be rotated, e.g. through the action of wind on the rotor blades 22, until a desired position for the cabin 100 is reached. The pitch angle of the blades and/or the generator torque may be varied for moving the hub 100 with a suitable rotational speed and for stopping the cabin 100 at the desired location. The wind turbine rotor 18 may then be locked. In other examples, the generator may be used as a motor for turning the wind turbine rotor 18 and cause the cabin 100 to move with the hub 20.

Rotating the cabin 100 may comprise yawing the nacelle 16 in some examples where the cabin 100 is secured to the nacelle 16. In other examples, the cabin may be moved with respect to the nacelle, e.g. on one or more rails or in other suitable ways. Maintenance on the nacelle and/or on a yaw system may be performed from a cabin movably or fixedly attached to the nacelle.

In the examples where the cabin 100 is connected to an uptower component 110, e.g. through a rail 129 or attachment points 126 on the uptower component 110, rotating the cabin 100 may comprise pulling or pushing the cabin 100 around the uptower component 110. The cabin 100 may therefore move along a tangential direction 121 of the uptower component 110. I.e., rotating the cabin 100 may comprise in general rotating the cabin around a central axis of the uptower component.

The method may further comprise rotating the cabin 100 with respect to the uptower component 110 to a further, i.e. new, maintenance position, e.g. moving the cabin 100 around the uptower component 110 or with the hub 20 or the nacelle 16 to a further maintenance position, and performing maintenance of the uptower component in the further maintenance position. I.e., if maintenance is further needed in other regions of the uptower component 110, the current maintenance position becomes the starting position and, from there, the cabin is moved to another maintenance position.

In some examples, the cabin 100 may be installed on the wind turbine when performing maintenance operations is required. After the maintenance is finished, the cabin 100 may be removed from the wind turbine 10. One or more lifting devices such as cranes may be used to lift and install the cabin 100.

Figure 7:
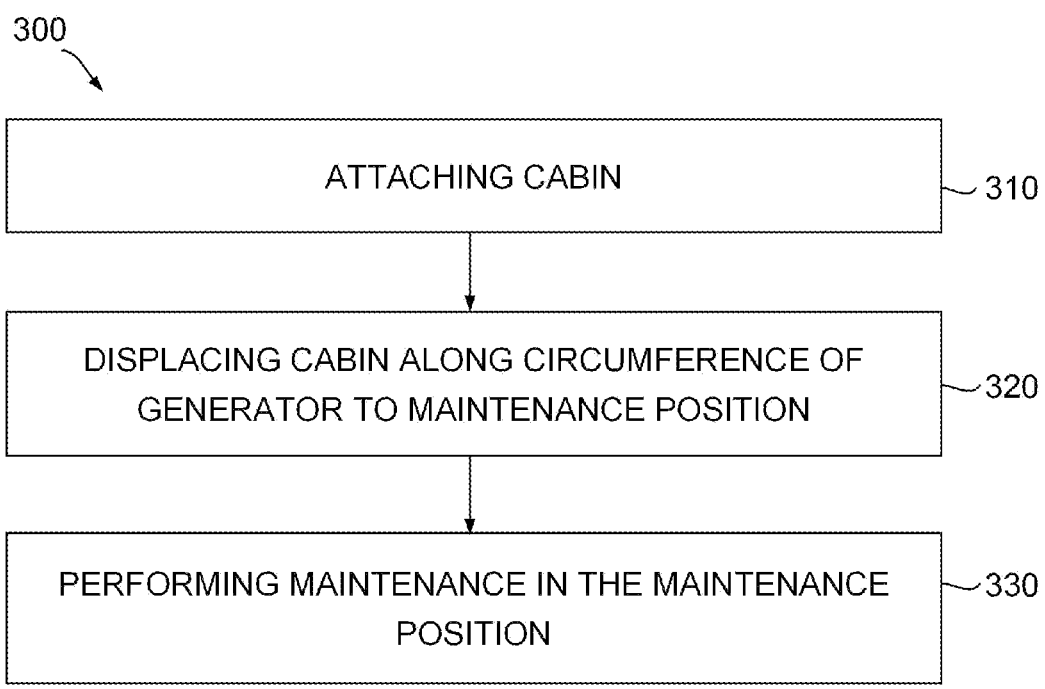
FIG. 7 shows a flow chart of another method for performing maintenance on an exterior side of a wind turbine generator of a direct drive wind turbine.

According to a further aspect of the disclosure, a further method 300 is provided. Method 300 is schematically illustrated in FIG. 7. The method comprises, at step 310, attaching a cabin 100 to an outside of a wind turbine generator of a direct drive wind turbine. One or more operators may enter the cabin 100 secured to the generator, e.g. to an external rotor or to an external stator of a generator of the direct drive wind turbine. The method further comprises, at step 320, displacing the cabin 100 along a circumference of the wind turbine generator to a maintenance position. The method further comprises, at step 330, performing maintenance in the maintenance position.

The method may further comprise displacing the cabin 100 along the circumference of the wind turbine generator to a new maintenance position, and performing maintenance in the new maintenance position. In general, the method may comprise sequentially displacing, e.g. rotating, the cabin 100 along a tangential direction 121 of the generator of the direct drive wind turbine to positions in which maintenance is required.

The cabin 100 may be displaced by moving the cabin 100 along one or more rails 129 or other guiding elements. The rails 129 may be permanently attached to the external rotor or stator (or in general to any uptower component of this disclosure) or they may be attached to the rotor or the stator when maintenance is required. A rail 129 may be divided into a plurality of rail portions which may be lifted and attached to the external rotor or stator. One or more helicopters, drones, cranes or suitable lifting devices may be used to join the rail 129 or rail portions to the external rotor or stator. In some examples, an intermediate element may be provided between the rail 129 or rail portions. An intermediate element may e.g. be configured to be clamped to the external rotor or stator.

Sequentially rotating the cabin 100 may comprise detaching one or more attachment points 125 of the cabin from one or more attachment points 126 of the external rotor or the external stator of the generator, rotating the cabin, e.g. by pulling the cabin, and attaching one or more other attachment points 125 of the cabin 100 to one or more other attachment points 126 of the external rotor or the external stator. The cabin 100 may be secured in each of the positions in which maintenance is to be performed. For example, bolts and nuts may be used for securing the cabin 100 and avoiding further movement of the cabin 100 along a tangential direction 121 of the generator. Before rotating the cabin 100, the cabin may need to be unsecured, e.g. unlocked.

In some examples, the cabin 100 may be displaced by using one or more linear actuators, a cable or a geared connection between the external rotor or external stator of the generator and the cabin 100.

During the displacement of the cabin 100, e.g. the sequential rotation of the cabin 100, a floor 120 of the cabin 100 may be maintained in a horizontal orientation. The floor 120 may be a platform which is configured to move along a tangential direction 111 of the cabin 100 when the cabin 100 is displaced along the circumference of the wind turbine generator. An operator may therefore be in a comfortable orientation inside the cabin 100.

Previous explanations and features regarding a cabin 100, a wind turbine to which the cabin 100 is mounted and method 200 may apply to this method 300, and vice versa.

Even though not illustrated in further detail, in any of the examples of cabins, wind turbines and methods disclosed herein, the cabin may be configured to house a tool in addition to or instead of a person. The cabin may be displaced with respect to the uptower component as illustrated hereinbefore. A tool, e.g. an automated robot may then perform maintenance as needed. In some examples, such a cabin may include a video camera or other visualization system for identifying a position of the tool with respect to the wind turbine components.

In some examples, a cabin may be opened at least partially for the tool to be able to carry out maintenance. E.g. a hatch or openable roof may be used for the tool to extend out of the cabin.

This written description uses examples to disclose the teaching, including the preferred embodiments, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A device for performing maintenance on an exterior of an uptower component of a wind turbine, the device comprising:
   a cabin structure defining an internal space to accommodate an operator and tools therein; and
   means for attaching the cabin structure to the uptower component of the wind turbine so that the cabin structure is variably positionable around the uptower component, wherein the means for attaching the cabin structure to the uptower component comprises a plurality of attachment points spaced circumferentially around the cabin structure in a first arcuate arrangement and a plurality of corresponding attachment points spaced circumferentially around the uptower component in a second arcuate arrangement, wherein a subset of the plurality of attachment points spaced circumferentially around the cabin structure in the first arcuate arrangement align and join together with a subset of the plurality of attachment points spaced circumferentially around the uptower component in the second arcuate arrangement, wherein the device is configured to sequentially rotate the cabin structure along a tangential direction of the uptower component.

2. The device of claim 1, further comprising a floor within the cabin structure, the floor variably positionable within the cabin structure so as to maintain a horizontal support position for the operation and tools at variable positions of the cabin structure around the uptower component.

3. The device of claim 1, wherein the cabin structure is attachable to the uptower component such that the cabin structure is rotatable about a central axis of the uptower component.

4. The device of claim 3, further comprising guide elements configured on the cabin structure that engage with corresponding guides on the uptower component to positively guide the cabin structure around the uptower component.

5. The device of claim 1, wherein the cabin structure rotates about a central axis of the cabin structure as the cabin structure moves to various positions around the uptower component.

6. A wind turbine, comprising:
a tower;
an uptower component supported atop the tower; and
the device for performing maintenance on an exterior of the uptower component according to claim 1.

7. The wind turbine of claim 6, wherein the uptower component comprises one of a wind turbine generator component, a nacelle, or a yaw system.

8. The wind turbine of claim 6, further comprising an actuator connecting the uptower component and the cabin structure to rotate the cabin structure around the uptower component.

9. The wind turbine of claim 8, wherein the actuator comprises one of a linear actuator or a cable.

10. The wind turbine of claim 6, wherein the cabin structure is attached to a hub or a nacelle of the wind turbine.

11. The wind turbine of claim 10, wherein the hub or the nacelle further comprises a hatch for accessing the cabin structure from an inside of the hub or the nacelle.

12. The device of claim 1, wherein the uptower component is a stator of a generator of the wind turbine.

13. A method for performing maintenance on an uptower component of a wind turbine, the method comprising:
attaching a cabin structure externally to the uptower component via a subset of a plurality of attachment points spaced circumferentially around the cabin structure in a first arcuate arrangement that align and join with a subset of a plurality of corresponding attachment points spaced circumferentially around the uptower component in a second arcuate arrangement, the cabin structure configured to support an operator and tools therein;
sequentially rotating the cabin structure along a tangential direction of the wind turbine to a desired maintenance position; and
performing maintenance on the uptower component in the maintenance position of the cabin structure.

14. The method of claim 13, wherein rotating the cabin structure comprises rotating a hub or yawing a nacelle to rotate the cabin structure to the maintenance position.

15. The method of claim 13, wherein rotating the cabin structure comprises rotating the cabin structure around a central axis of the uptower component.

16. The method of claim 13, wherein the uptower component is a stator of a generator of the wind turbine.

* * * * *